United States Patent
Sawada et al.

(10) Patent No.: US 7,140,991 B2
(45) Date of Patent: Nov. 28, 2006

(54) SHIFT CONTROL SYSTEM, AND CONTROL APPARATUS AND METHOD FOR BELT-TYPE CONTINUOUSLY VARIABLE TRANSMISSION

(75) Inventors: Makoto Sawada, Aichi (JP); Masahiro Yamamoto, Kanagawa (JP); Midori Yamaguchi, Kanagawa (JP)

(73) Assignee: Jatco Ltd, Fuji (JP)

( * ) Notice: Subject to any disclaimer, the term of this patent is extended or adjusted under 35 U.S.C. 154(b) by 629 days.

(21) Appl. No.: 10/673,549

(22) Filed: Sep. 30, 2003

(65) Prior Publication Data

US 2004/0127330 A1 Jul. 1, 2004

(30) Foreign Application Priority Data

Sep. 30, 2002 (JP) ............................... 2002-285502

(51) Int. Cl.
- *F16H 61/04* (2006.01)
- *F16H 61/18* (2006.01)
- *B60K 41/12* (2006.01)

(52) U.S. Cl. ........................... 474/28; 474/18; 477/43; 477/47

(58) Field of Classification Search .................. 474/17, 474/28; 477/43–49; 701/51–61, 70, 74, 701/83

See application file for complete search history.

(56) References Cited

U.S. PATENT DOCUMENTS

| | | | | |
|---|---|---|---|---|
| 6,083,138 A | * | 7/2000 | Aoyama et al. | ................ 477/5 |
| 6,157,884 A | * | 12/2000 | Narita et al. | .................. 701/51 |
| 6,721,643 B1 | * | 4/2004 | Hanggi et al. | ................. 474/28 |
| 7,065,441 B1 | * | 6/2006 | Yamamoto et al. | ........... 477/44 |
| 2004/0059489 A1 | * | 3/2004 | Hanggi et al. | ................. 701/51 |
| 2004/0157700 A1 | | 8/2004 | Katou | |

FOREIGN PATENT DOCUMENTS

| | | | | |
|---|---|---|---|---|
| EP | 1236935 A2 | * | 9/2002 | |
| JP | 05-332445 A | * | 2/1993 | .................. 477/46 |
| JP | 7-217712 A | | 8/1995 | |
| JP | 08-177540 A | * | 7/1996 | |
| JP | 11-20513 A | * | 1/1999 | |

OTHER PUBLICATIONS

U.S. Appl. No. 10/674,069, filed Sep. 30, 2003, Sawada et al.
U.S. Appl. No. 10/664,031, filed Sep. 17, 2003, Yamamoto et al.

(Continued)

*Primary Examiner*—Marcus Charles
(74) *Attorney, Agent, or Firm*—Foley & Lardner LLP

(57) ABSTRACT

A shift control system includes a belt-type continuously variable transmission (CVT) with primary and secondary pulleys, a shift actuator that regulates an oil pressure supplied to the primary or secondary pulley to vary an actual transmission ratio of the CVT, and a control unit that controls the shift actuator. The control unit sets a target transmission ratio in a first mode when a normal driving range is selected and in a second mode when an engine braking range is selected, drives the shift actuator to adjust the actual transmission ratio to the target transmission ratio, determines a delay time to delay the setting of the target transmission ratio in the second mode at the time of range switchover from the normal driving range to the engine braking range, and holds the target transmission ratio set in the first mode until the delay time has elapsed from the range switchover.

9 Claims, 7 Drawing Sheets

OTHER PUBLICATIONS

U.S. Appl. No. 10/674,091, filed Sep. 30, 2003, Jozaki et al.
U.S. Appl. No. 10/670,270, filed Sep. 26, 2003, Nobu.
U.S. Appl. No. 10/670,271, filed Sep. 26, 2003, Nobu.
U.S. Appl. No. 10/662,442, filed Sep. 26, 2003, Ochiai et al.
U.S. Appl. No. 10/670,223, filed Sep. 26, 2003, Wakayama.
U.S. Appl. No. 10/670,775, filed Sep. 26, 2003, Shimanaka et al.

* cited by examiner

SHIFT CONTROL SYSTEM, AND CONTROL APPARATUS AND METHOD FOR BELT-TYPE CONTINUOUSLY VARIABLE TRANSMISSION

BACKGROUND OF THE INVENTION

The present invention relates to a shift control system and a control apparatus and method for a belt-type continuously variable transmission.

Japanese Laid-Open Patent Publication No. 7-217712 discloses a belt-type continuously variable transmission (CVT) of which transmission ratio is controlled in response to a vehicle speed and a throttle valve opening. The CVT has selectable shift ranges including a normal driving range (generically known as D range) and a so-called engine braking range (such as such as L range or 1 range, 2 range or Ds range). When the normal driving range is selected, the transmission ratio is controlled according to a shift pattern within a normal driving ratio control region. When the engine braking range is selected, the transmission ratio is controlled according to a shift pattern within an engine braking ratio control region that has a minimum ratio value greater than that of the normal driving ratio control region.

SUMMARY OF THE INVENTION

In the case of actuating a selector lever for range switchover from the normal driving range to the engine braking range, the shift pattern is changed so that the transmission ratio becomes forcibly and abruptly increased. It is thus necessary to rapidly raise a line pressure of the CVT so as to provide a sufficient belt tension (i.e. torque transmission capability) for such a manual downshift from the normal driving range to the engine braking range.

However, the rise time of the CVT line pressure is generally longer than the operating time of a CVT shift actuator. If a shift command is given immediately after the range switchover from the normal driving range to the engine braking range, the rise in the CVT line pressure tends to lag behind the operation of the shift actuator. Accordingly, the CVT cannot secure a sufficient line pressure, and the slippage of a CVT torque transmission belt occurs due to belt tension deficiency to thereby impair the durability of the belt becomes.

In order to avoid the above-mentioned problem, it is alternatively conceivable to keep the CVT line pressure at a high level at all times. In this case, however, the deterioration of fuel efficiency cannot be avoided.

It is therefore an object of the present invention to provide a shift control system in which a belt-type continuously variable transmission (CVT) can assuredly secure a sufficient line pressure for a manual downshift from a normal driving range to an engine braking range so as to prevent belt slippage without a deterioration in fuel efficiency.

It is also an object of the present invention to provide a control apparatus and method for a belt-type continuously variable transmission (CVT) by which the CVT can assuredly secure a sufficient line pressure for a manual downshift from a normal driving range to an engine braking range.

According to a first aspect of the invention, there is provided a shift control system, comprising: a continuously variable transmission having a primary pulley and a secondary pulley drivingly connected to the primary pulley by a belt; a shift actuator that regulates an oil pressure supplied to either of the primary and secondary pulleys to continuously vary an actual transmission ratio of the transmission; and a control unit that controls the shift actuator, the control unit being configured to: set a target transmission ratio in a first mode using a shift pattern within a normal driving ratio control region when a normal driving range is selected and in a second mode using a shift pattern within an engine braking ratio control region when an engine braking range is selected; drive the shift actuator so as to adjust the actual transmission ratio to the target transmission ratio; determine a delay time to delay the setting of the target transmission ratio in the second mode at the time of range switchover from the normal driving range to the engine braking range; and hold the target transmission ratio set in the first mode until the delay time has elapsed from the range switchover.

According to a second aspect of the invention, there is provided a control apparatus for a continuously variable transmission having a primary pulley and a secondary pulley drivingly connected to the primary pulley by a belt, the apparatus comprising: means for setting a target transmission ratio in a normal driving mode when a normal driving range is selected and in an engine braking mode when an engine braking range is selected; means for adjusting an actual transmission ratio of the transmission to the target transmission ratio; means for increasing a line pressure of the transmission in response to range switchover from the normal driving range to the engine braking range; and means for delaying the setting of the target transmission ratio in the engine braking mode until the line pressure substantially reaches a the target value.

According to a third aspect of the invention, there is provided a control method for a continuously variable transmission having a primary pulley and a secondary pulley drivingly connected to the primary pulley by a belt, the method comprising: setting a target transmission ratio in a first mode using a shift pattern within a normal driving ratio control region when a normal driving range is selected, and in a second mode using a shift pattern within an engine braking ratio control mode when an engine braking range is selected; controlling an oil pressure supplied to either of the primary and secondary pulleys of the transmission so as to adjust an actual transmission ratio of the transmission to the target transmission ratio; determining a delay time to delay the setting of the target transmission ratio in the engine at the time of range switchover from the normal driving range to the engine braking range; and holding the target transmission set in the first mode until the delay time has elapsed from the range switchover.

The other objects and features of the invention will also become understood from the following description with reference to the accompanying drawings.

DESCRIPTION OF THE EMBODIMENTS

The present invention will be described in more detail with reference to the drawings.

Figure 1:
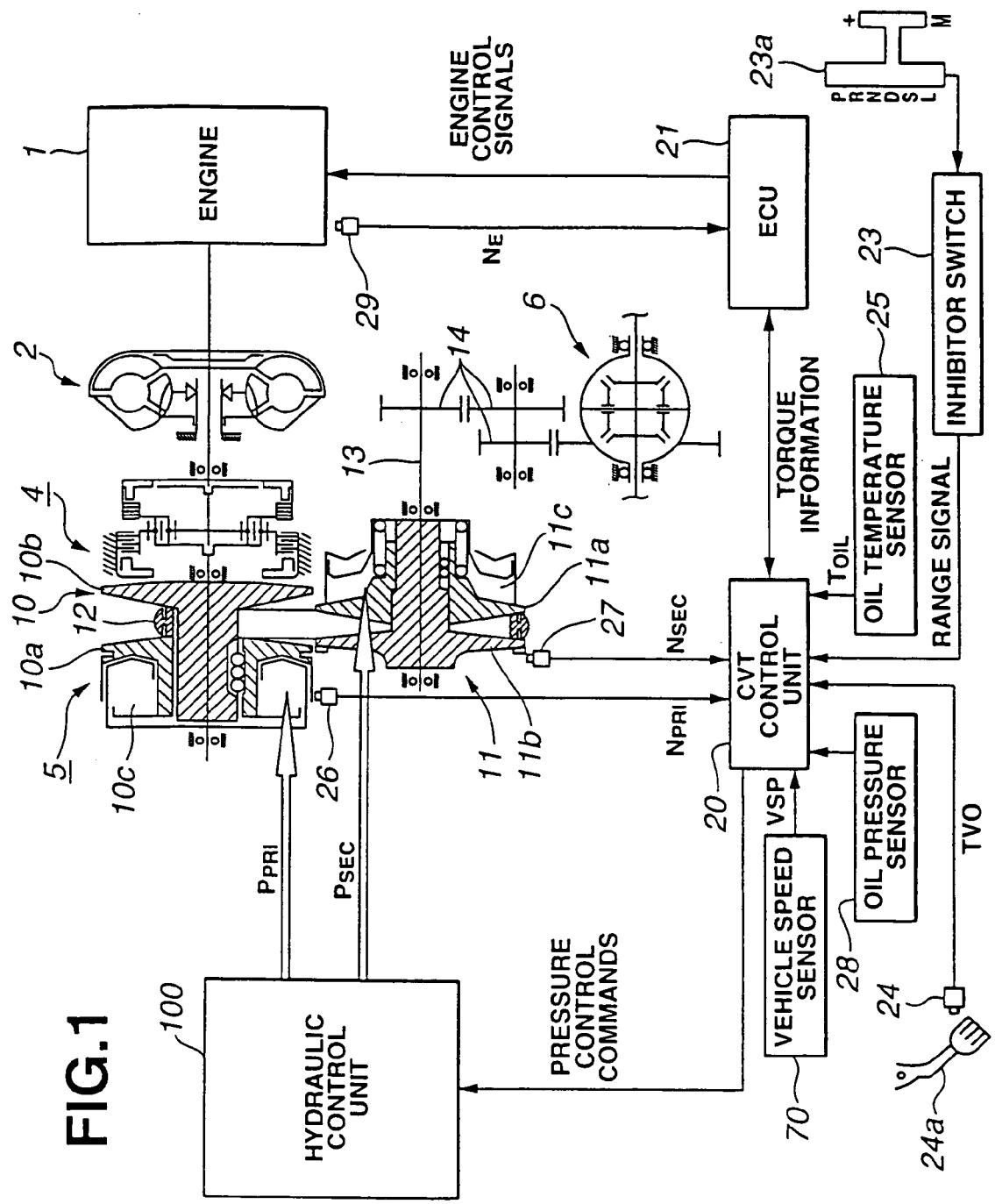
FIG. 1 is a schematic configuration of a shift control system according to one exemplary embodiment of the invention.
Figure 2:
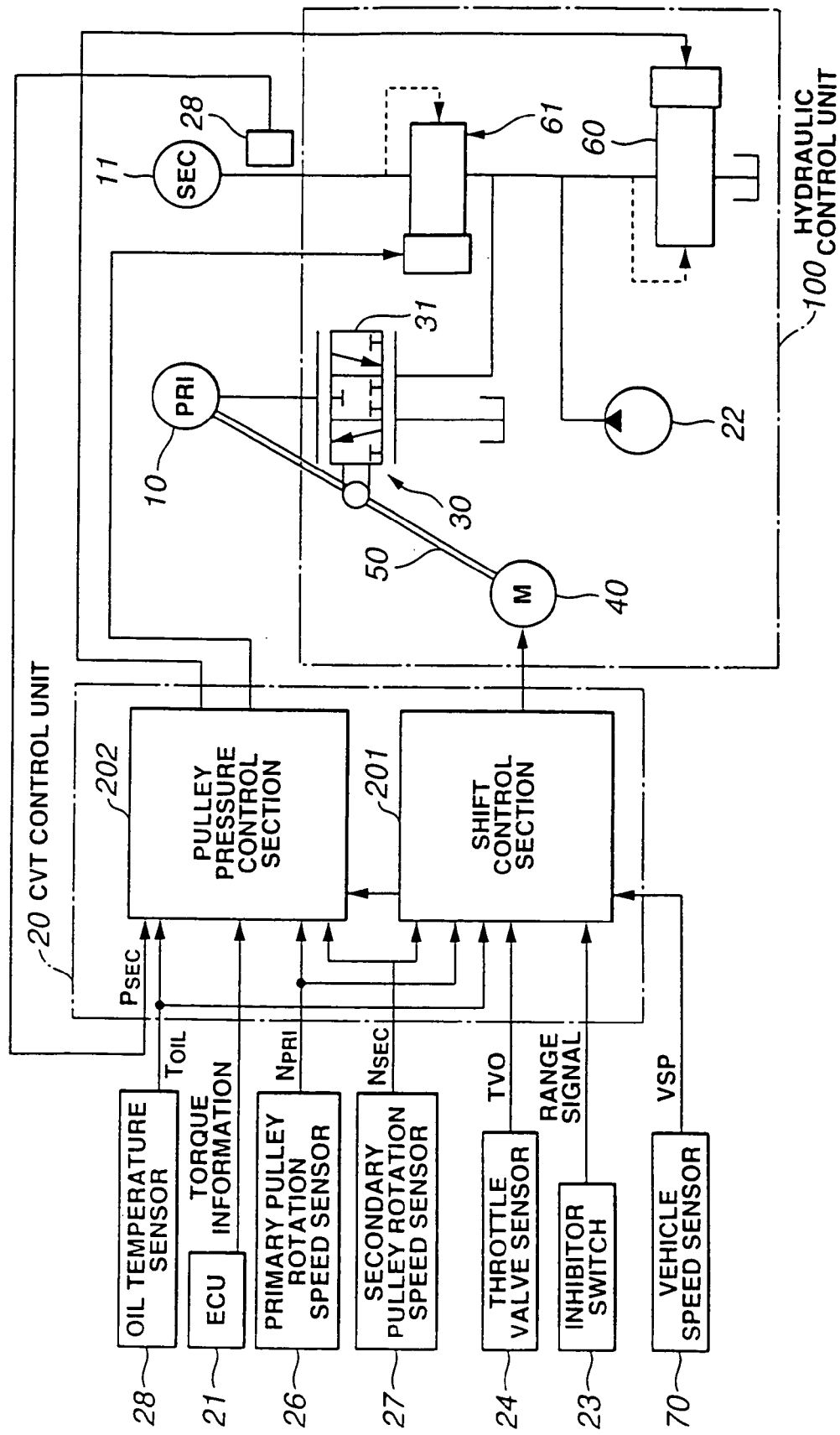
FIG. 2 is a block diagram showing a CVT control unit and a hydraulic control unit of the shift control system of FIG. 1.

As shown in FIGS. 1 and 2, a vehicle in which the present invention is to be embodied generally includes an engine 1, a torque converter 2 equipped with a lock-up clutch, a forward/reverse changeover mechanism 4, a belt-type continuously variable transmission (CVT) 5, a differential gear 6, an engine control unit (ECU) 21, a CVT control unit 20 and a hydraulic control unit 100.

The CVT 5 is connected to the engine 1 via the torque converter 2 and the forward/reverse changeover mechanism 4, and has a belt 12, a pair of pulleys, i.e., a primary pulley 10 and a secondary pulley 11 drivingly connected to the primary pulley 10 by the belt 12 and a selector lever 23a. The primary pulley 10 is coupled to a torque input shaft of the CVT 5, and the secondary pulley 11 is coupled to a torque output shaft 13 of the CVT 5. Further, the output shaft 13 of the CVT 5 is linked to the differential gear 6 via an idler shaft and an idler gear 14 mounted on the idler shaft.

The primary pulley 10 has an axially-fixed conical pulley disc 10b rotated together with the torque input shaft of the CVT 5, an axially-movable conical pulley disc 10a opposed to the pulley disc 10b such that the pulley discs 10a and 10b define a V-shaped pulley groove therebetween, and a cylinder chamber 10c. The pulley disc 10a is moved in the direction of the torque input shaft according to an oil pressure supplied to the cylinder chamber 10c (hereinafter referred to as a "primary pressure $P_{PRI}$"), so as to adjust the width of the pulley groove and thereby change the radius of the belt 12 coming into contact with the primary pulley 10.

Similarly, the secondary pulley 11 has an axially-fixed conical pulley disc 11b rotated together with the torque output shaft 13 of the CVT 5, an axially-movable conical pulley disc 11a opposed to the pulley disc 11b such that the pulley discs 11a and 11b define a V-shaped pulley groove therebetween, and a cylinder chamber 11c. The pulley disc 11a is moved in the direction of the torque output shaft 13 according an oil pressure supplied to the cylinder chamber 11c (hereinafter referred to as a "secondary pressure $P_{SEC}$"), so as to adjust the width of the pulley groove and thereby change the radius of the belt 12 coming into contact with the secondary pulley 11.

In the above structure, a driving torque is input from the engine 1 to the CVT 5 via the torque converter 2 and the forward/reverse changeover mechanism 4, and then, transmitted from the primary pulley 10 to the secondary pulley 11 through the belt 12. At this time, the pulley discs 10a and 11a are moved to change the radii of the belt 12 coming into contact with the pulleys 10 and 11, respectively, so that the transmission ratio (sometimes called pulley ratio) between the primary pulley 10 and the secondary pulley 11 varies continuously.

The CVT 5 is operated under the control of the hydraulic control unit 100 and the CVT control unit 20, whereas the engine is operated under engine control signals from the ECU 21. More specifically, the CVT control unit 20 determines various CVT operating conditions (including the transmission ratio and the friction force developed between the belt 12 and the pulleys 10 and 11) based on the input from the ECU 21 and from the after-mentioned detectors, and outputs pressure control commands (including a shift control command and solenoid control commands) to the hydraulic control unit 100. Then, the hydraulic control unit 100 is actuated upon receipt from the commands from the CVT control unit 20 to control and operates the CVT 5 in such a manner as to satisfy the determined CVT operating conditions.

The hydraulic control unit 100 has an oil pump 22 that supplies the CVT 5 with lubricating oil, a pressure regulator valve 60 that regulates a line pressure $P_L$ of the CVT 5 (i.e. a pressure of oil ejected from the oil pump 22), a shift control valve 30 that regulates the primary pressure $P_{PRI}$, a pressure reducing valve 61 that regulates the secondary pressure $P_{SEC}$, a servo link 50 (as a mechanical feedback mechanism) and a stepping motor 40 (as a shift actuator) as shown in FIG. 2.

The pressure regulator valve 60 is equipped with a solenoid to adjust the line pressure $P_L$ as appropriate in response to the solenoid control command (such as a duty signal) from the CVT control unit 20. The line pressure $P_L$ is fed to the shift control valve 30 and to the pressure reducing valve 61.

The shift control valve 30 is coupled to the servo link 50. With ends of the servo link 50 connected to the stepping motor 40 and the pulley disc 10a of the primary pulley 10, respectively, the shift control valve 30 is driven by the stepping motor 40 while getting feed back from the primary pulley 10 on the width of the pulley groove of the primary pulley 10 (i.e. the actual transmission ratio of the CVT 5). Namely, the stepping motor 40 operates upon receipt of the shift control command from the CVT control unit 20 in such a manner that the servo link 50 moves to displace a spool 31 of the shift control valve 30. Then, the shift control valve 30 adjusts the line pressure $P_L$ to the primary pressure $P_{PRI}$ in accordance with the displacement of the spool 31 and feeds the primary pressure $P_{PRI}$ to the cylinder chamber 10c of the primary pulley 10 so as to control the transmission ratio to a target value. After the completion of shifting, the stepping motor 40 operates such that the servo link 50 moves to close the spool 31.

The pressure reducing valve 61 is also equipped with a solenoid to adjust the secondary pressure $P_{SEC}$ in response to the solenoid control command (such as a duty signal) from the CVT control unit 20.

In order for the CVT control unit 20 and the ECU 21 to monitor the operating status of the vehicle, there are provided various detectors including an inhibitor switch 23, a primary pulley rotation speed sensor 26, a secondary pulley rotation speed sensor 27, an oil pressure sensor 28, a throttle valve sensor 24, an oil temperature sensor 25, an engine speed sensor 29 and a vehicle speed sensor 70. The inhibitor switch 23 detects the position of the selector lever 23a and outputs a range signal indicative of the selected shift range. Herein, the selector lever 23a is operated by a driver to select among shift ranges including a normal driving range (generically known as D range) and a so-called engine braking range (such as L range or 1 range, 2 range, Ds range or M range) that can provide an engine braking effect. The throttle valve sensor 24 detects a throttle valve opening TVO in response to the amount of depression of an accelerator pedal 24a (i.e. accelerator pedal stroke). The primary pulley rotation speed sensor 26, the secondary pulley rotation speed sensor 27, the oil pressure sensor 28, the oil temperature sensor 25, the engine speed sensor 29 and the vehicle speed sensor 70 detect a rotation speed $N_{PRI}$ of the primary pulley 10, a rotation speed $N_{SEC}$ of the secondary pulley 11, a secondary pressure $P_{SEC}$, an oil temperature $T_{OIL}$ of the CVT 5, an engine speed $N_E$, and a vehicle speed VSP, respectively. The CVT control unit 20 is connected with the ECU 21 and the above-mentioned detectors 23 to 29 and 70 to receive engine torque information including the engine speed $N_E$ and fuel injection amount (injection pulse width) as well as the input about the position of the selector lever 23a, the primary pulley rotation speed $N_{PRI}$, the secondary pulley rotation speed $N_{SEC}$, the secondary pressure $P_{SEC}$, the throttle valve opening TVO, the oil temperature $T_{OIL}$ and the vehicle speed VSP.

In the present embodiment, the CVT control unit 20 has a shift control section 201 and a pulley pressure control section 202 as shown in FIG. 2.

Figure 8:
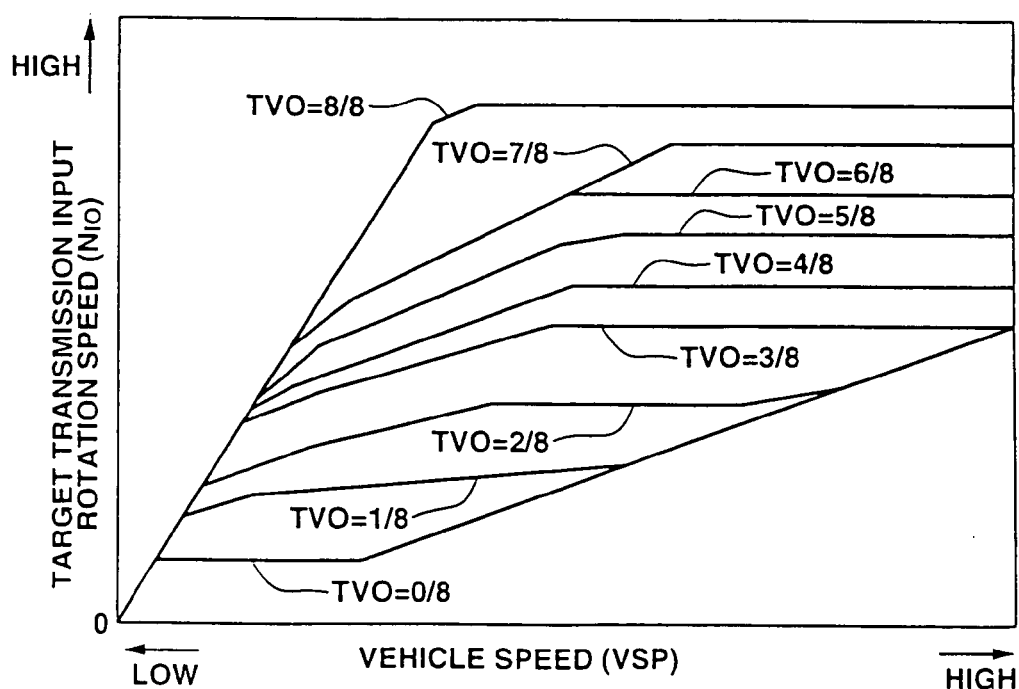
FIG. 8 shows one example of D-range shift pattern.
Figure 9:
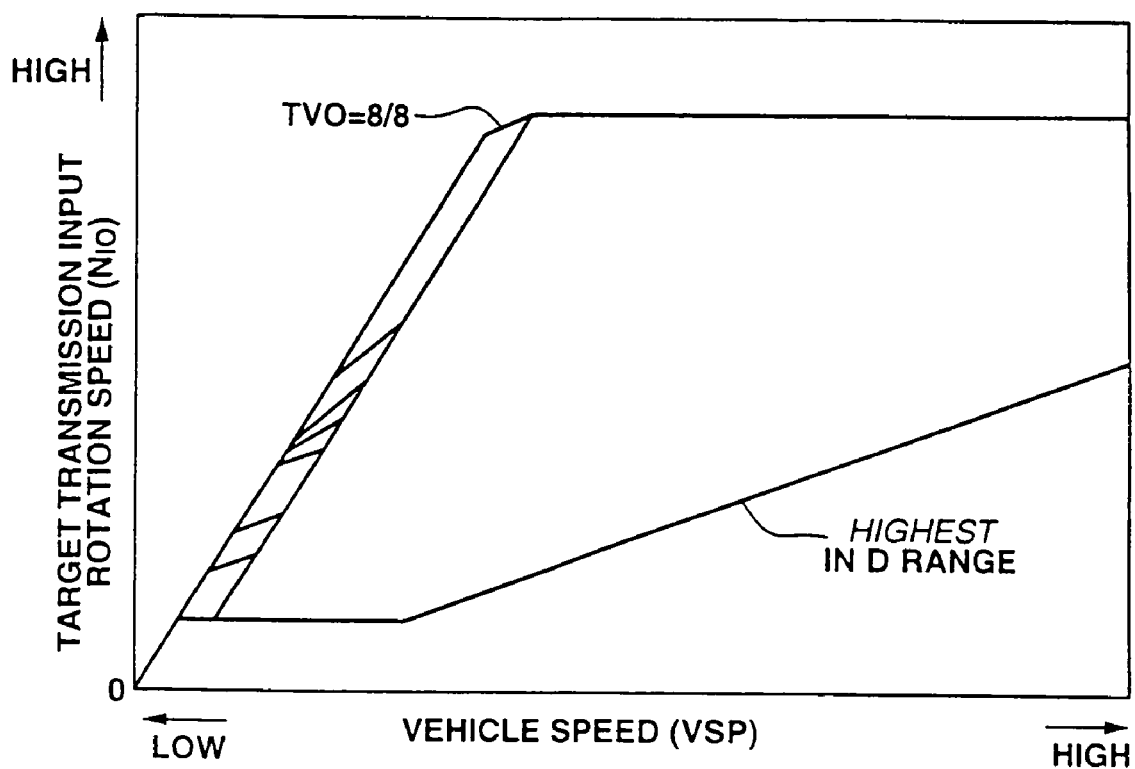
FIG. 9 shows one example of L-range shift pattern.

The shift control section 201 sets a target transmission ratio according to a predetermined shift pattern based on the vehicle speed VSP and the throttle valve opening TVO, and provides the shift control command to drive the stepping motor 40 so as to adjust the actual transmission ratio to the target transmission ratio. For example, the target transmission ratio is set in a normal driving mode using a shift pattern (e.g. a D-range shift pattern shown in FIG. 8) within a normal driving ratio control region, when the normal driving range is selected. When the engine braking range is selected, the target transmission ratio is set in an engine braking mode using a shift pattern (e.g. a L-range shift pattern shown in FIG. 9) within an engine braking ratio control region that has a minimum ratio value greater than a minimum ratio value (corresponding to the highest-speed transmission ratio i.e. "HIGH") of the normal driving ratio control region.

The pulley pressure control section 202 controls the thrust of the primary and secondary pulleys 10 and 11 (i.e. the friction force developed between the belt 12 and the pulleys 10 and 11) in response to the engine torque information, the transmission ratio calculated from the pulley rotation speed $N_{PRI}$ and $N_{SEC}$, the oil temperature $T_{OIL}$, the shift speed and the like. Namely, the pulley pressure control section 202 sets a target value for the CVT line pressure $P_L$ and drives the solenoid of the pressure regulator valve 60 so as to adjust the line pressure $P_L$ to the target value. The pulley pressure control section 202 also sets a target value for the secondary pressure $P_{SEC}$ and performs feedback control (closed-loop control) based on the target value and the detection value of the oil pressure sensor 28 to drive the solenoid of the pressure reducing valve 61 so as to adjust the secondary pressure $P_{SEC}$ to the target value.

Figure 3:
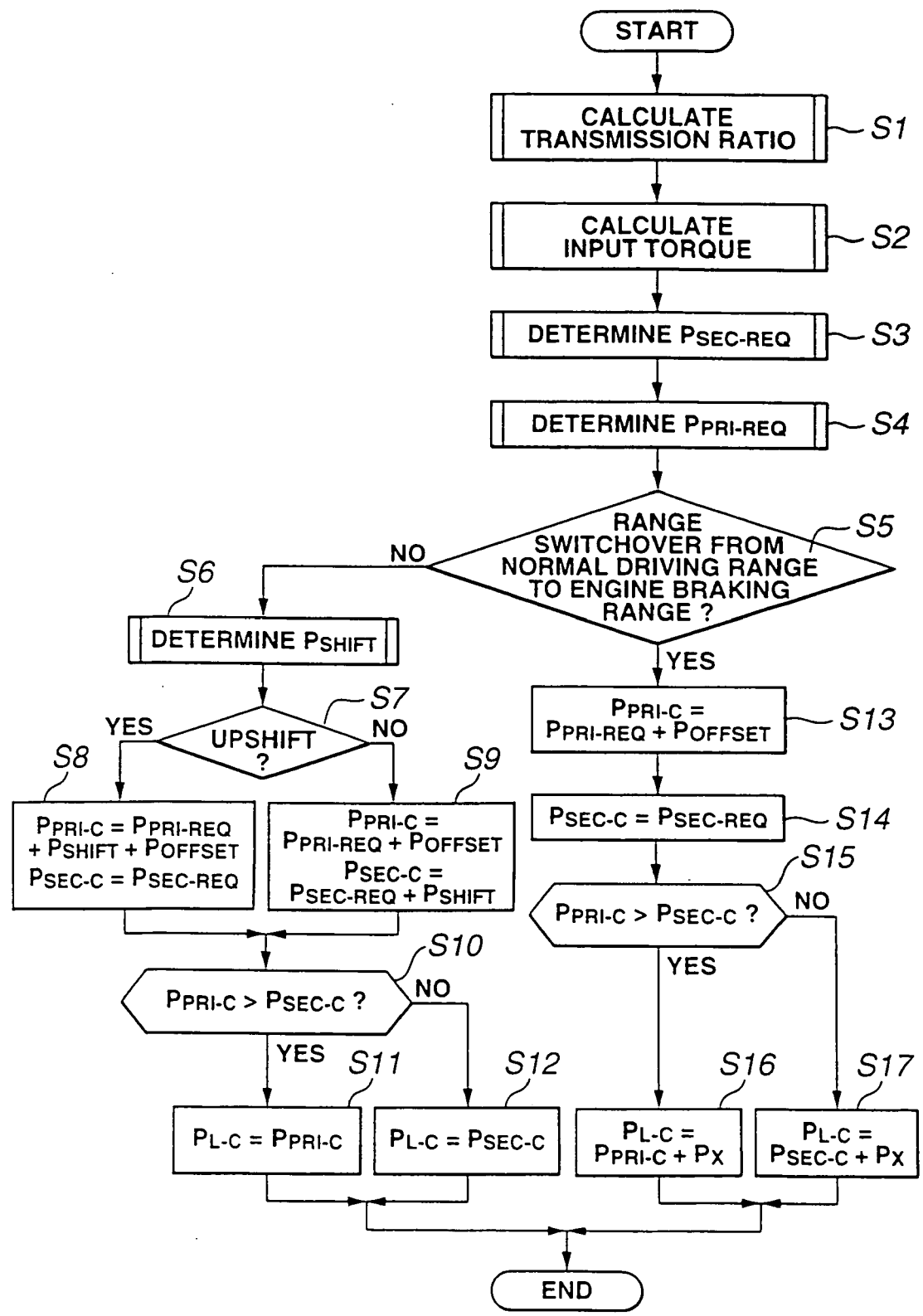
FIG. 3 is a flow chart for a CVT line pressure control process according to an embodiment of the present invention.

As shown in FIG. 3, the CVT control unit 20 runs a CVT line pressure control program to control the line pressure $P_L$.

In step S1, the CVT control unit 20 calculates the actual transmission ratio (i.e. pulley ratio) using the pulley rotation speeds $N_{PRI}$ and $N_{SEC}$ detected by the respective pulley rotation speed sensors 26 and 27.

In step S2, the CVT control unit 20 calculates the torque input to the CVT 5 using the engine torque information read from the ECU 21.

Figure 4:
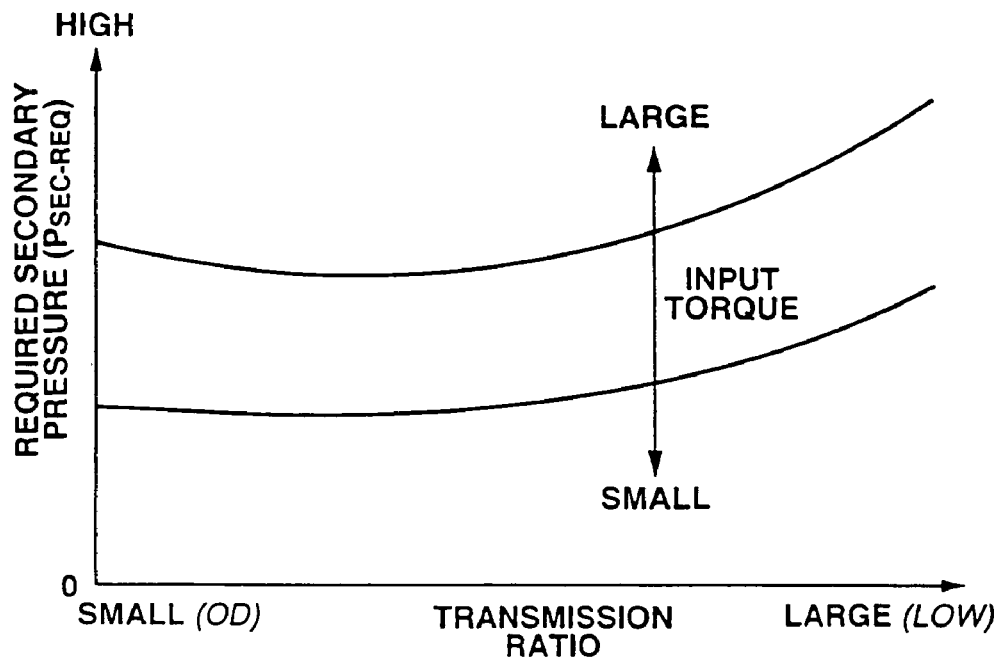
FIG. 4 is a map showing the relationship between a required secondary pressure, a CVT transmission ratio and a CVT input torque according to an embodiment of the present invention.

In step S3, the CVT control unit 20 determines a required secondary pressure $P_{SEC-REQ}$ based on the calculated actual transmission ratio and input torque with reference to a given map of FIG. 4. As indicated in the map, the required secondary pressure $P_{SEC-REQ}$ is set to increase as the transmission ratio increases (toward the "OD" side) and to decrease as the transmission ratio decreases (toward the "LOW" side). The required secondary pressure $P_{SEC-REQ}$ is set to increase as the input torque increases and to decrease as the input torque decreases.

Figure 5:
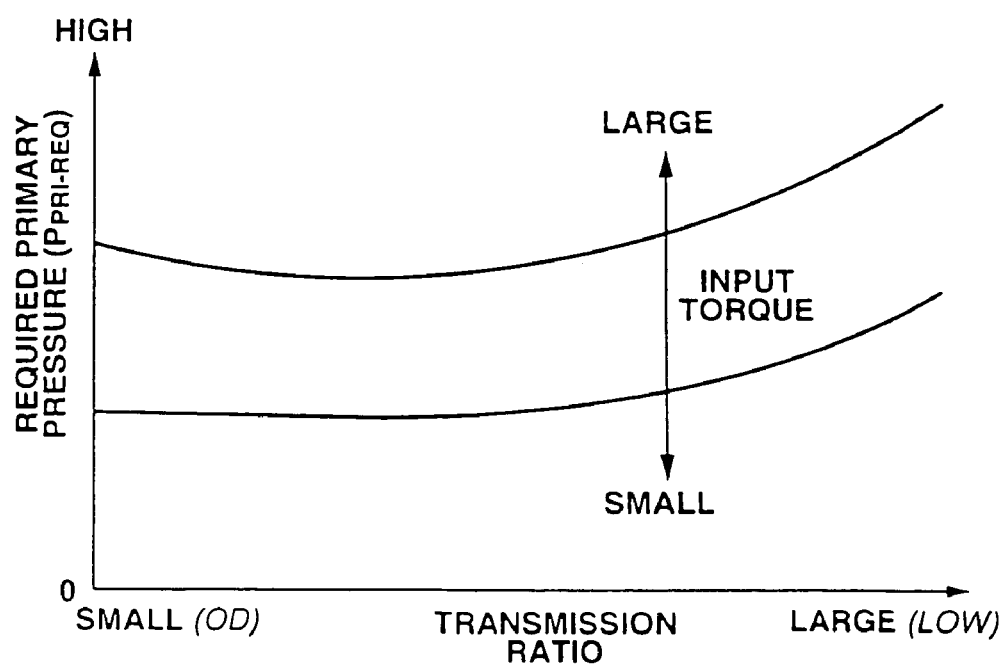
FIG. 5 is a map showing the relationship between a required primary pressure, a CVT transmission ratio and a CVT input torque according to an embodiment of the present invention.

In step S4, the CVT control unit 20 determines a required primary pressure $P_{PRI-REQ}$ based on the calculated actual transmission ratio and input torque with reference to a given map of FIG. 5. As indicated in the map, the required primary pressure $P_{PRI-REQ}$ is also set to increase as the transmission ratio increases (toward the "OD" side) and to decrease as the transmission ratio decreases (toward the "LOW" side). The required primary pressure $P_{PRI-REQ}$ is set to increase as the input torque increases and to decrease as the input torque decreases. Further, the required primary pressure $P_{PRI-REQ}$ is set relatively high with respect to the required secondary pressure $P_{SEC-REQ}$ when the transmission ratio is low. On the other hand, the required primary pressure $P_{PRI-REQ}$ is set relatively low with respect to the required secondary pressure $P_{SEC-REQ}$ when the transmission ratio is large. Depending on the input torque, the magnitude relationship between the required primary pressure $P_{PRI-REQ}$ and the required secondary pressure $P_{SEC-REQ}$ may become inversed.

In step S5, the CVT control unit 20 judges whether a predetermined time period has elapsed after the detection of the range switchover from the normal driving range to the engine braking range. The above predetermined time period is set longer than a delay time dT described later. If No in step S5, the routine goes to step S6. If Yes in step S5, the routine goes to step S13.

In step S6, the CVT control unit 20 determines a pressure $P_{SHIFT}$ required for shifting. For example, the pressure $P_{SHIFT}$ can be determined by the following procedure. The CVT control unit 20 looks up a final target transmission input rotation speed $N_{IO}$ in the appropriate shift pattern (e.g. the D-range shift pattern) based on the vehicle speed VSP and the throttle valve opening TVO, and then, calculates a final target transmission ratio from the final target transmission input rotation speed $N_{IO}$. Next, the CVT control unit 20 refers to a time constant set to each shift mode (such as upshift, downshift or kick-down), and calculates a transient target transmission ratio from the final target transmission ratio based on a first order delay due to the time constant such that the transient target transmission ratio follows the final target transmission ratio with the time constant. Finally, the CVT control unit 20 sets the pressure $P_{SHIFT}$ at a pressure value required to achieve the transient target transmission ratio with reference to a given map (not shown).

In step S7, the CVT control unit 20 judges whether or not the shift mode is upshift. If Yes in step S7, the routine goes to step S8. If No in step S7, the routine goes to step S9.

In step S8, the CVT control unit 20 sets a primary pressure command value $P_{PRI-C}$ and a secondary pressure command value $P_{SEC-C}$ as follows:

$$P_{PRI-C} = P_{PRI-REQ} + P_{SHIFT} + P_{OFFSET}, \text{ and}$$

$$P_{SEC-C} = P_{SEC-REQ},$$

where $P_{OFFSET}$ is an offset value.

In step S9, the CVT control unit 20 sets a primary pressure command value $P_{PRI-C}$ and a secondary pressure command value $P_{SEC-C}$ as follows:

$$P_{PRI-C} = P_{PRI-REQ} + P_{OFFSET}, \text{ and}$$

$$P_{SEC-C} = P_{SEC-REQ} + P_{SHIFT},$$

where $P_{OFFSET}$ is an offset value.

In step S10, the CVT control unit 20 makes a comparison between the primary pressure command value $P_{PRI-C}$ and the secondary pressure command value $P_{SEC-C}$ to determine whether the primary pressure command value $P_{PRI}$ is larger than the secondary pressure command value $P_{SEC-C}$. If Yes in step S10 ($P_{PRI-C}>P_{SEC-C}$), the routine goes to step S11. If No in step S10 ($P_{PRI-C}=P_{SEC-C}$), the routine goes to step S12.

In step S11, the CVT control unit 20 sets a line pressure command value $P_{L-C}$ as follows: $P_{L-C}=P_{PRI-C}$.

In step S12, the CVT control unit 20 sets a line pressure command value $P_{L-C}$ as follows: $P_{L-C}=P_{SEC-C}$.

In step S13, the CVT control unit 20 sets $P_{PRI-C}=P_{PRI-REQ}+P_{OFFSET}$, where $P_{OFFSET}$ is an offset value.

Herein, the offset value $P_{OFFSET}$ used in steps S8, S9 and S13 is set according to the characteristics of the shift control valve 30 so as to compensate for pressure loss.

In step S14, the CVT control unit 20 sets a secondary pressure command value $P_{SEC-C}$ as follows: $P_{SEC-C}=P_{SEC-REQ}$.

In step S15, the CVT control unit 20 makes a comparison between the primary pressure command value $P_{PRI-C}$ and the secondary pressure command value $P_{SEC-C}$ to determine whether the primary pressure command value $P_{PRI-C}$ is larger than the secondary pressure command value $P_{SEC-C}$. If Yes in step S15 ($P_{PRI-C}>P_{SEC-C}$), the routine goes to step S16. If No in step S15 ($P_{PRI-C}=P_{SEC-C}$), the routine goes to step S17.

In step S16, the CVT control unit 20 sets a line pressure command value $P_{L-C}$ as follows: $P_{L-C}=P_{PRI-C}+P_X$, where $P_X$ is a predetermined value.

In step S17, the CVT control unit 20 sets a line pressure command value $P_{L-C}$ as follows: $P_{L-C}=P_{SEC-C}+P_X$, where $P_X$ is a predetermined value.

The predetermined value $P_X$ used in steps S16 and S17 is provided to step up the line pressure command value $P_{L-C}$ to promote a rise in the line pressure $P_L$, and is set at a pressure value (e.g. 3 MPa) enough to prevent the slippage of the belt 12 during the manual downshift from the normal driving range to the engine braking range.

In other words, the line pressure command value $P_{L-C}$ is set by adding the predetermined value $P_X$ to the higher one of the pressure command values $P_{PRI-C}$ and $P_{SEC-C}$ until the predetermined time period has elapsed after the detection of the range switchover from the normal driving range to the engine braking range. At other times, the line pressure command value $P_{L-C}$ is set to the higher one of the pressure command values $P_{PRI-C}$ and $P_{SEC-C}$ without adding the predetermined value $P_X$.

The CVT control unit 20 converts the line pressure command value $P_{L-C}$ into a controlled variable (as e.g. a duty signal) so as to drive the solenoid of the pressure regulator valve 60 and adjust the line pressure $P_L$ to the line pressure command value $P_{L-C}$.

Figure 6:
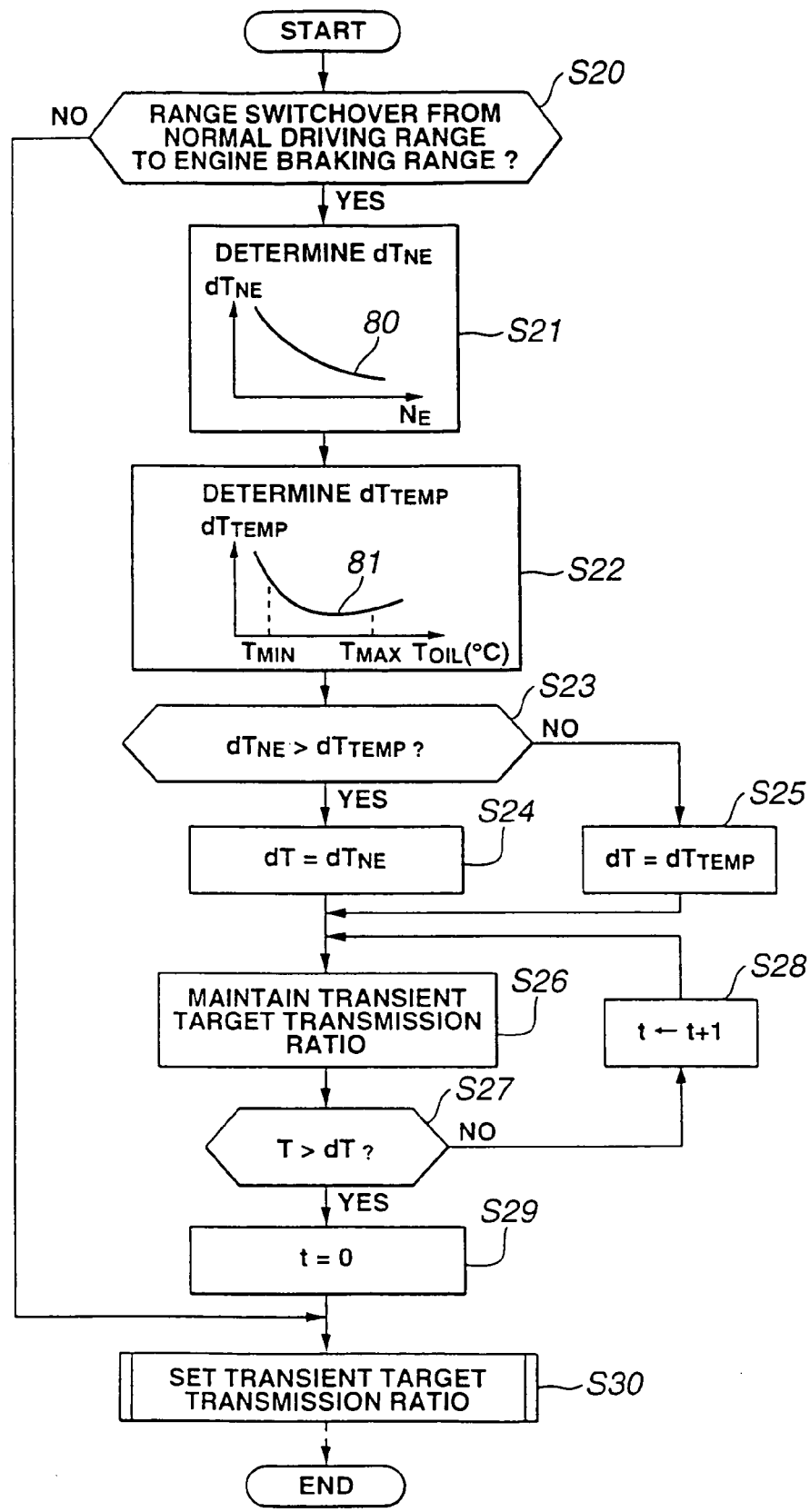
FIG. 6 is a flow chart for a target transmission ratio holding process according to an embodiment of the present invention.

The CVT control unit 20 also runs a target transmission ratio holding program for the manual downshift from the normal driving range to the engine braking range, as shown in FIG. 6.

In step S20, the CVT control unit 20 judges, based on the range signal from the inhibitor switch 23, whether the range switchover from the normal driving range to the engine braking range has been accomplished. If Yes in step S20, the routine goes to step S21. If No in step S20, the routine goes to step S30.

In step S21, the CVT control unit 20 determines a delay time value $dT_{NE}$ based on the engine speed $N_E$ input from the engine speed sensor 29 the with reference to a $N_E$-vs.-$dT_{NE}$ curve 80. The delay time period $dT_{NE}$ corresponds to a time period required to increase the line pressure $P_L$ by the above-mentioned predetermined value $P_X$ after the range switchover from the normal driving range to the engine braking range. When the engine speed $N_E$ is low, it takes much time to increase the line pressure $P_L$ due to small ejection capacity of the oil pump 22. As indicated by the curve 80, the delay time period $dT_{NE}$ is thus set to increase as the engine speed $N_E$ decreases and to decrease as the engine speed $N_E$ increases.

In step S22, the CVT control unit 20 determines a delay time period $dT_{TEMP}$ based on the oil temperature $T_{OIL}$ input from the oil temperature sensor 25 with reference to a $T_{OIL}$-vs.-$dT_{TEMP}$ curve 81. The delay time period $dT_{TEMP}$ corresponds to a time period required to increase the line pressure $P_L$ by the above-mentioned predetermined value $P_X$ after the range switchover from the normal driving range to the engine braking range. When the oil temperature $T_{OIL}$ is too high, the viscosity of the lubricating oil becomes excessively low. In such a case, it takes much time to increase the line pressure $P_L$ to a desired degree due to the larger amount of oil leakage. On the other hand, the viscosity of the lubricating oil becomes excessively high when the oil temperature $T_{OIL}$ is too low. It also takes much time to increase the line pressure $P_L$ to a desired degree. As indicated by the curve 81, the delay time period $dT_{Tmp}$ is thus set to increase with increase in a deviation of the oil temperature $T_{OIL}$ from a predetermined oil temperature range. The maximum and minimum temperature limits $T_{MAX}$ and $T_{MIN}$ of the oil temperature range are e.g. 0° C. to 80° C., respectively.

In step S23, the CVT control unit 20 makes a comparison between the determined delay time periods $dT_{NE}$ and $dT_{TEMP}$ to judge whether the delay time period $dT_{NE}$ is longer than the delay time period $dT_{TMP}$. If Yes in step S23 ($dT_{NE}>dT_{TEMP}$), the routine goes to step S24. If No in step S23 ($dT_{NE}=dT_{TEMP}$), the routine goes to step S25.

In step S24, the CVT control unit 20 sets $dT=dT_{NE}$.

In step S25, the CVT control unit 20 sets $dT=dT_{TMP}$.

In step S26, the CVT control unit 20 outputs the shift control command to the stepping motor 40 so as to maintain the transient target transmission ratio set in the normal driving mode immediately before the range switchover from the normal driving range to the engine braking range.

In step S27, the CVT control unit 20 judges whether a timer t exceeds the delay time dT. If No in step S27 the routine goes to step S28 (t=dT). If Yes in step S27 (t>dT), the routine goes to step S29.

In step S28, the CVT control unit 20 increments the timer t by 1. Then, the routine goes back to step S27.

In step S29, the CVT control unit 20 initializes the timer t.

In step S30, the CVT control unit 20 renewedly sets the transient target transmission ratio. In the present embodiment, the transient target transmission ratio is set by the following procedure. That is, the CVT control unit 20 determines a final target transmission ratio based on the vehicle speed VSP and the throttle valve opening TVO with reference to the shift pattern appropriate to the selected shift range (e.g. the D- or L-range shift pattern). The CVT control unit 20 calculates the transient target transmission ratio from the final target transmission ratio based on a first order delay due to the time constant set to the corresponding shift mode (such as upshift, downshift or kick-down).

Alternatively, the program may be modified such that the delay time dT is determined by the following linear expression: $dT=K_{NE}\times dT_{NE}+K_{TEMP}\times dT_{TEMP}$, where $K_{NE}$ and $K_{TEMP}$ are gains, respectively.

Figure 7:
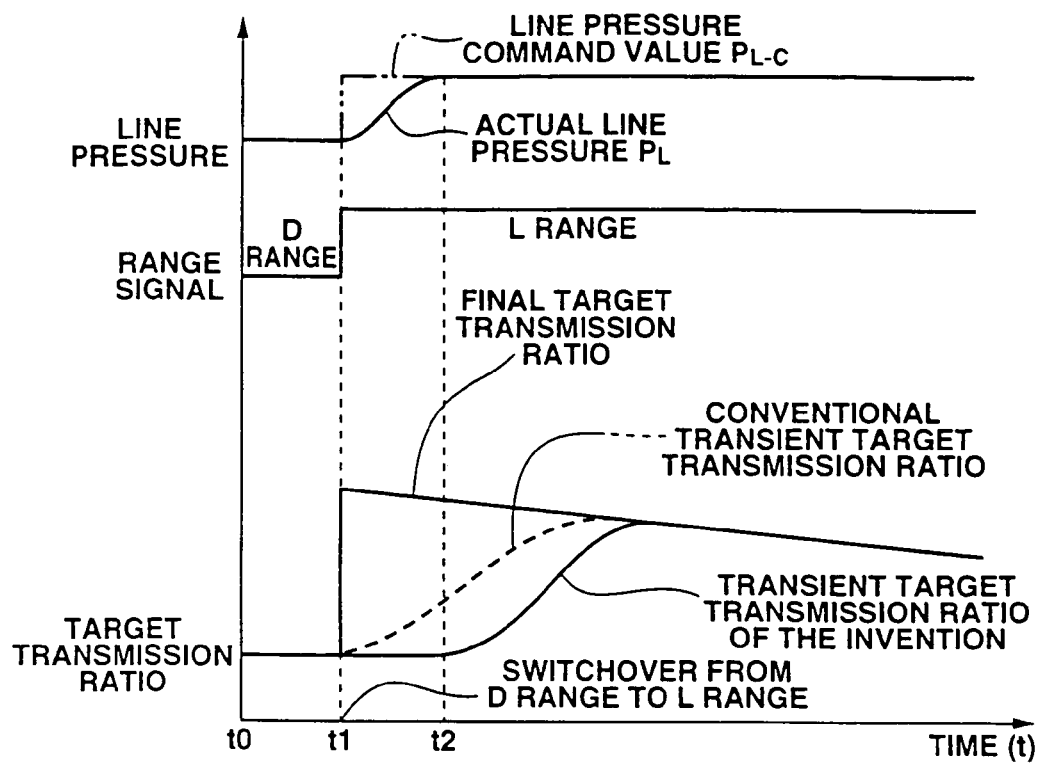
FIG. 7 is a timing chart of the line pressure control process and the target transmission ratio holding process.

As shown in FIG. 7, the above-mentioned target transmission ratio holding procedure is executed in parallel to the line pressure control procedure.

It is now assumed that the selector lever 23a is not operated and held in D range during the period of time between the instant t0 and the instant t1. The range signal from the inhibitor switch 23 stays at D range. Accordingly, the target transmission ratio holding program goes from step S20 to step S30 as shown in FIG. 6. The CVT control unit 20 sets the transient target transmission ratio in the normal driving mode using the D-range shift pattern and controls the stepping motor 40 so as to adjust the actual transmission ratio to the transient target transmission ratio. At the same time, the line pressure control program repeatedly goes through steps S1 to S7, S8 or S9, S10 and S11 or S12 as shown in FIG. 3. The CVT control unit 20 sets the line pressure command value $P_{L-C}$ as the higher one of the primary and secondary pressure command values $P_{PRI-C}$ and $P_{SEC-C}$ and controls the pressure regulator valve 60 so as to adjust the line pressure $P_L$ to the line pressure command value $P_{L-C}$.

At the instant t1, the selector lever 23a is operated to switch from D range to e.g. L range, so that the range signal from the inhibitor switch 23 changes from D range to L range. Then, the target transmission ratio holding program goes through steps S20 to S23, S24 or S25 and S26 to S28 as shown in FIG. 6. The CVT control unit 20 determines the delay time dT to delay the setting of the transient target transmission ratio in the engine braking mode, and holds the transient target transmission ratio set in the normal driving mode until the delay time dT has elapsed from the range switchover from D range to L range. Further, the line pressure control program repeatedly goes through steps S1 to S5, S13 to S15 and S16 or S17 as shown in FIG. 6. The CVT control unit 5 sets the line pressure command value $P_{L,C}$ by adding the offset value $P_X$ to the higher one of the primary and secondary pressure command values $P_{PRI-C}$ and $P_{SEC-C}$ and controls, during the predetermined time period, the pressure regulator valve 60 so as to adjust the line pressure $P_L$ to the line pressure command value $P_{L-C}$.

At the instant t2, the timer t becomes larger than the delay time dT. The target transmission ratio holding program proceeds to steps S28, S29 and S30 and then repeatedly goes through steps S20 to S30 as shown in FIG. 6. The CVT control unit 20 sets the transient target transmission ratio in the engine braking mode using the L-range shift pattern and controls the stepping motor 40 so as to adjust the actual transmission ratio to the transient target transmission ratio. At the instant t2, the predetermined time period has not elapsed because the predetermine time is set longer than the delay time dT. The line pressure control program thus keeps on repeatedly going through steps S1 to S5, S13 to S15 and S16 or S17. It is however noted that the actual line pressure $P_L$ substantially agrees with the line pressure command value $P_{L-C}$ at the instant t2.

In the earlier technology, the transient target transmission ratio becomes increased immediately after the range switchover from the normal driving range to the engine braking range as indicated by a dotted line in FIG. 7. In this case, the actual line pressure cannot be raised to a sufficient degree so that belt slippage occurs due to belt tension deficiency. On the other hand, the transient target transmission ratio becomes increased at the time when the line pressure $P_L$ substantially agrees with the line pressure command value $P_{L-C}$ in the present embodiment. The CVT 5 can therefore secure a sufficient line pressure $P_L$ for the manual downshift from the normal driving range to the engine braking range, thereby preventing the slippage of the belt 12.

The manual downshift from D range to the engine braking range other than L range (such as 1 range, 2 range, Ds range or M range) can be controlled in the same manner as above.

As described above, the CVT control unit 20 holds the transient target transmission ratio set in the normal driving mode immediately before the range switchover from the normal driving range to the engine braking range, until the delay time dT has elapsed from the range switchover. Normally, the manual downshift from the normal driving range to the engine braking range causes an abrupt variation in the transmission ratio with the change of the shift pattern. In the present embodiment, however, the CVT 5 is able to increase its line pressure $P_L$ to a required degree prior to the downshift. There is no need to keep the line pressure $P_L$ at a higher level at all times. This makes it possible secure a sufficient belt tension for the manual downshift from the normal driving range to the engine braking range and thereby avoid the slippage of the belt 12 assuredly without a deterioration of fuel efficiency.

In addition, the delay time dT is determined such that the delay time dT increases with decrease in the engine speed $N_E$ and increases with increase in the deviation from the predetermined oil temperature range. This makes it possible to set the delay time dT more appropriately in compliance with the operating status of the vehicle.

The entire contents of Japanese Patent Application No. 2002-285502 (filed on Sep. 30, 2002) are herein incorporated by reference.

Although the present invention has been described with reference to a specific embodiment of the invention, the invention is not limited to the above-described embodiment. Various modification and variation of the embodiment described above will occur to those skilled in the art in light of the above teaching. The scope of the invention is defined with reference to the following claims.

What is claimed is:

1. A shift control system, comprising:
   a continuously variable transmission having a primary pulley and a secondary pulley drivingly connected to the primary pulley by a belt;
   a shift actuator that regulates an oil pressure supplied to either of the primary and secondary pulleys to continuously vary an actual transmission ratio of the transmission; and
   a control unit that controls the shift actuator, the control unit being configured to:
      set a target transmission ratio in a first mode using a shift pattern within a normal driving ratio control region when a normal driving range is selected and in a second mode using a shift pattern within an engine braking ratio control region when an engine braking range is selected;
      drive the shift actuator so as to adjust the actual transmission ratio to the target transmission ratio;
      determine a delay time to delay the setting of the target transmission ratio in the second mode at the time of range switchover from the normal driving range to the engine braking range; and
      hold the target transmission ratio set in the first mode until the delay time has elapsed from the range switchover.

2. A shift control system according to claim 1, further comprising an oil temperature sensor that detects an oil temperature of the transmission to determine a temperature deviation from a predetermined oil temperature range, wherein the control unit is configured to calculate the delay time such that the delay time increases with increase in the deviation.

3. A shift control system according to claim 2, further comprising an engine speed sensor that detects an engine speed,
wherein the control unit is configured to calculate the delay time such that the delay time increases with decrease in the engine speed.

4. A shift control system according to claim 1, further comprising an engine speed sensor that detects an engine speed,
wherein the control unit is configured to calculate the delay time such that the delay time increases with decrease in the engine speed.

5. A control apparatus for a continuously variable transmission having a primary pulley and a secondary pulley drivingly connected to the primary pulley by a belt, the apparatus comprising:
means for setting a target transmission ratio in a normal driving mode when a normal driving range is selected and in an engine braking mode when an engine braking range is selected;
means for adjusting an actual transmission ratio of the transmission to the target transmission ratio;
means for increasing a line pressure of the transmission in response to range switchover from the normal driving range to the engine braking range; and
means for delaying the setting of the target transmission ratio in the engine braking mode until the line pressure substantially reaches a the target value.

6. A shift control apparatus according to claim 5, further comprising means for determining a time period required to increase the line pressure by a predetermined pressure value after the range switchover,
wherein said delaying means delays the setting of the target transmission ratio in the engine braking mode until the determined time period has elapsed from the range switchover.

7. A control apparatus according to claim 6, further comprising:
means for detecting an oil temperature of the transmission to define a temperature deviation from a predetermined oil temperature range; and
means for detecting an engine speed,
wherein said determining means determines the time period such that the time period increases with increase in the temperature deviation and increases with decrease in the engine speed.

8. A control method for a continuously variable transmission having a primary pulley and a secondary pulley drivingly connected to the primary pulley by a belt, the method comprising:
setting a target transmission ratio in a first mode using a shift pattern within a normal driving ratio control region when a normal driving range is selected, and in a second mode using a shift pattern within an engine braking ratio control mode when an engine braking range is selected;
controlling an oil pressure supplied to either of the primary and secondary pulleys of the transmission so as to adjust an actual transmission ratio of the transmission to the target transmission ratio;
determining a delay time to delay the setting of the target transmission ratio in the engine at the time of range switchover from the normal driving range to the engine braking range; and
holding the target transmission set in the first mode until the delay time has elapsed from the range switchover.

9. A control method according to claim 8, further comprising:
detecting an oil temperature of the transmission to define a temperature deviation from a predetermined oil temperature range; and
detecting an engine speed,
wherein said determining includes:
calculating a first delay time period based on the detected oil temperature such that the first delay time period increases with increase in the temperature deviation;
calculating a second delay time period based on the detected engine speed such that the second delay time period increases with decrease in the engine speed; and
determines the delay time as a longer one of the first and second delay time periods.

* * * * *